United States Patent Office 2,941,612
Patented June 21, 1960

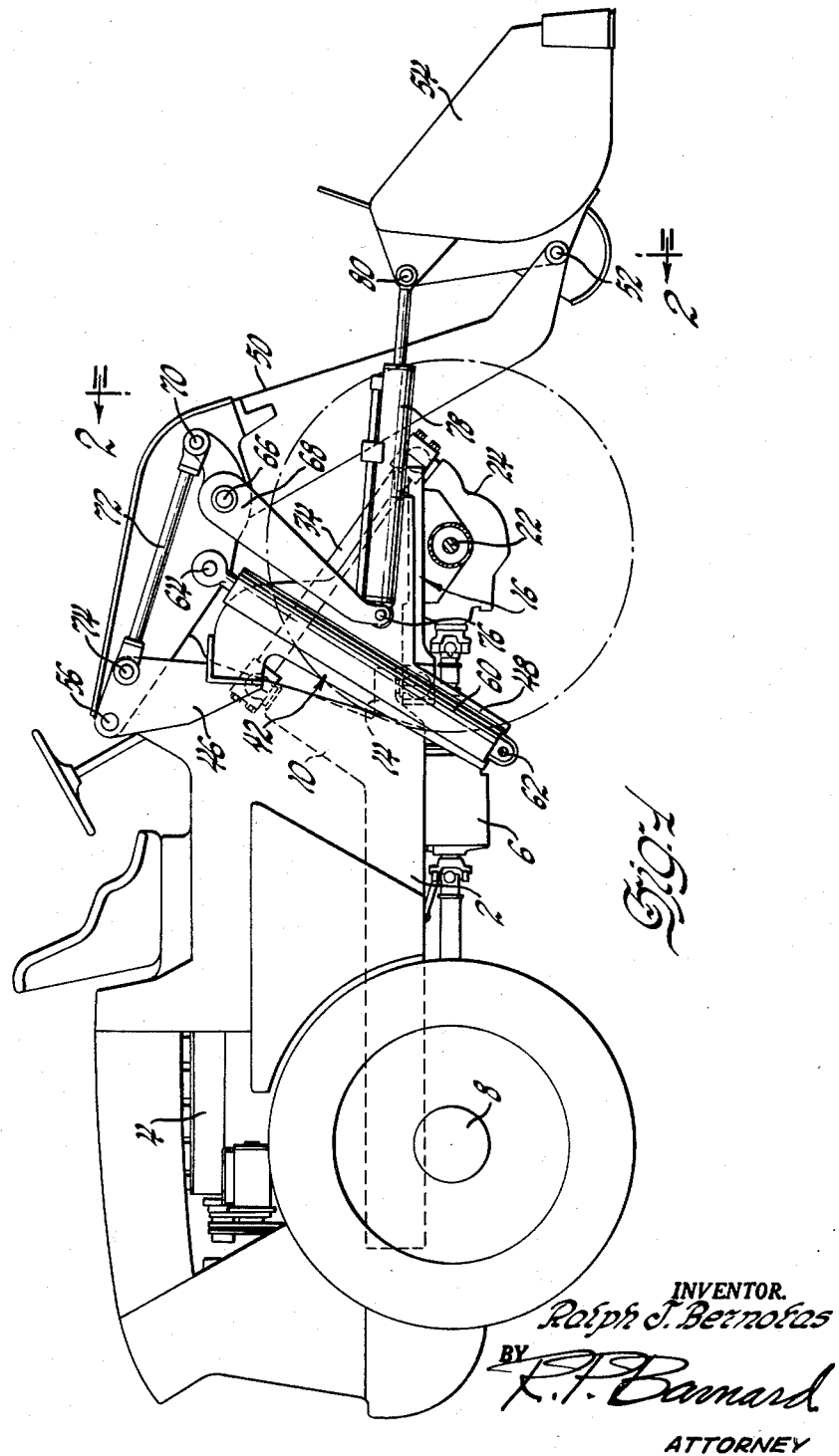

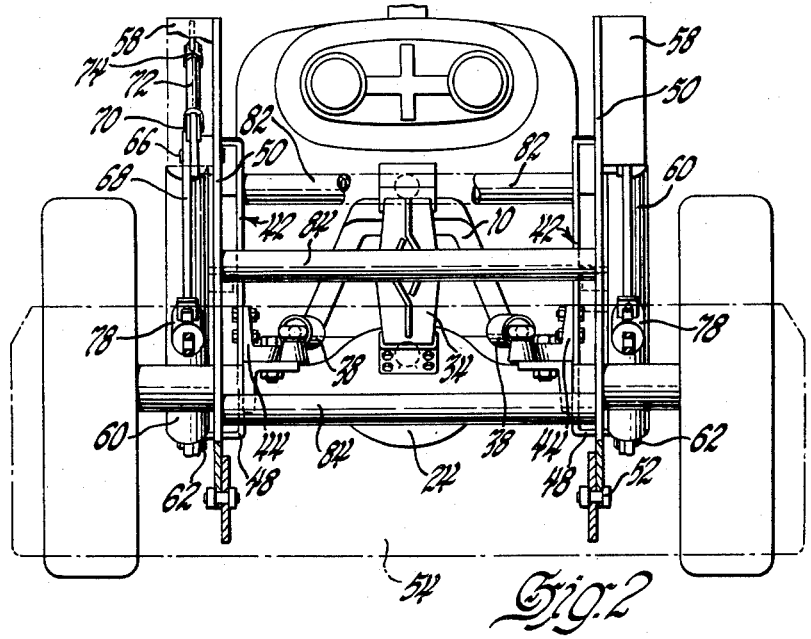
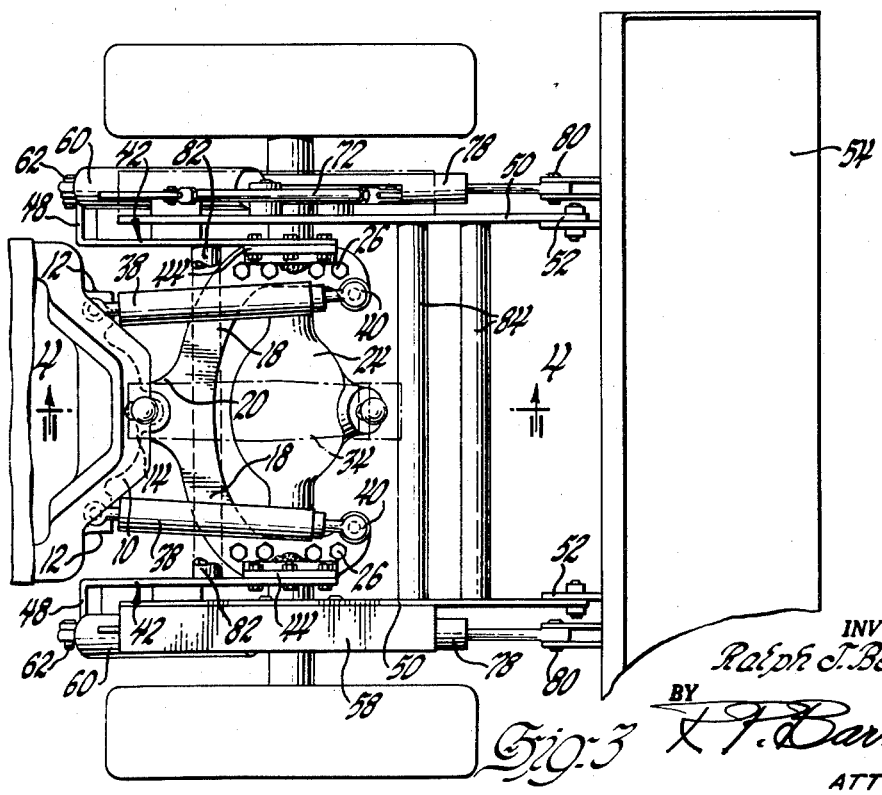

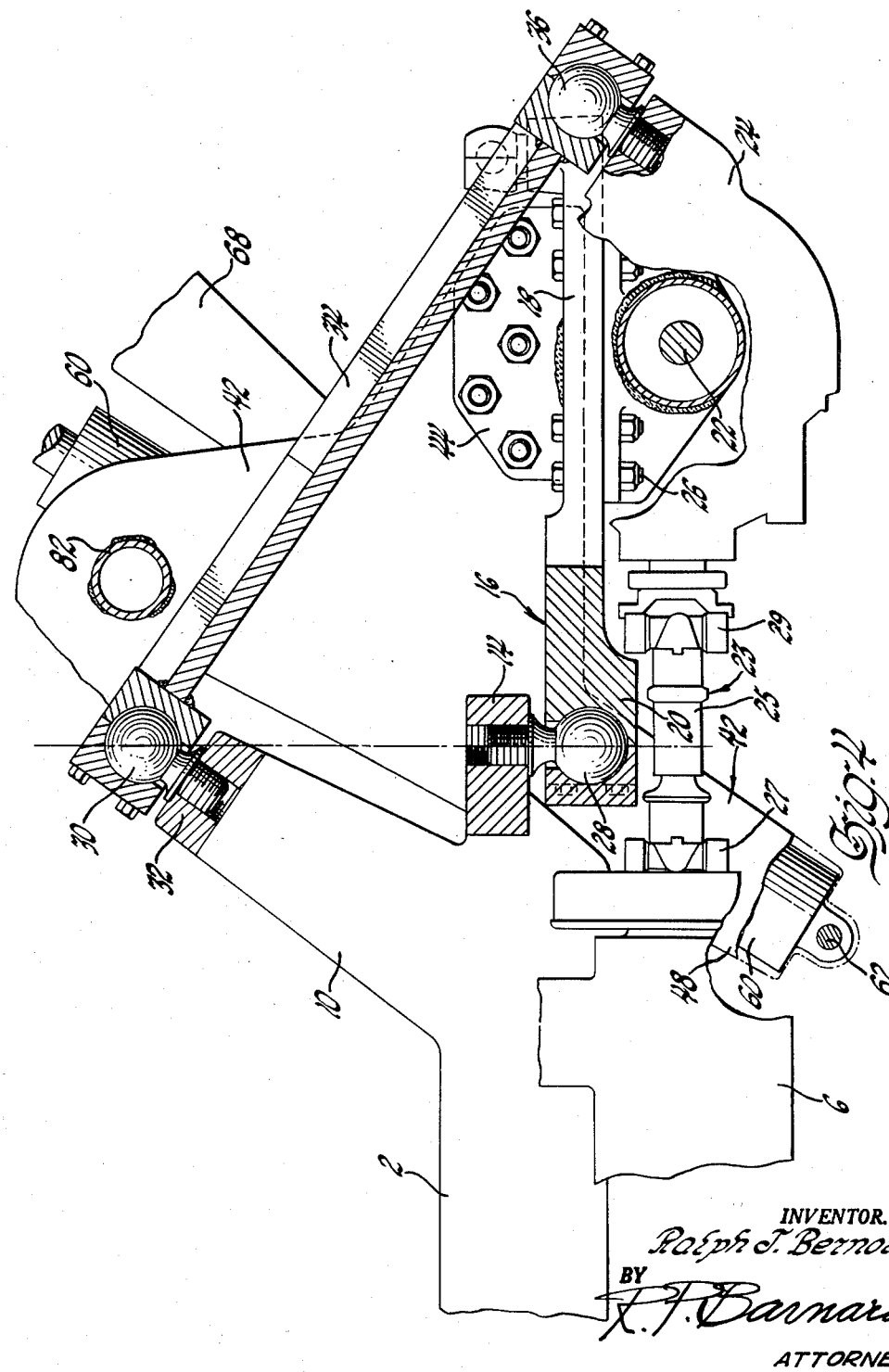

2,941,612

VEHICLE HAVING PIVOTALLY INTERCONNECTED FRONT AND REAR FRAME SECTIONS

Ralph J. Bernotas, South Euclid, Ohio, assignor to General Motors Corporation, Detroit, Mich., a corporation of Delaware Filed Dec. 21, 1956, Ser. No. 629,933

8 Claims. (Cl. 180—51)

The present invention relates to a steerable material handling vehicle in which the material handling structure is entirely supported on the steerable portion of the vehicle. More specifically, the present invention contemplates a high lift steerable excavator comprising two operatively connected articulable frames, the front frame having mounted entirely thereon for steering movement therewith a material handling bucket and its supporting boom and operating linkage.

In an apparatus of the type described, it is conventional to mount a material handling bucket or other attachment at the outer end of a boom which has its other end pivotally connected to the vehicle and which is vertically adjustable by fluid motors or other means. In such a vehicle, the bucket supporting mechanism is rigidly connected to the vehicle so as always to extend longitudinally forwardly of the frame of the latter. Thus, whether the vehicle be of the crawler tractor type or a four wheel rubber-tired vehicle, the entire vehicle must, in many instances, be entirely turned to present the loading bucket over a truck or other conveyance to receive the material from the bucket. Furthermore, with a bucket supporting mechanism so mounted on such a vehicle, the latter requires a rather large clearance circle for turning the vehicle about. Another problem is presented by the use of such a vehicle on a side hill slope; that is, the loader mechanism reduces the stability of the vehicle as it travels across such a slope and negotiates a turn up-hill or down-hill.

According to the present invention, there is provided a material handling vehicle comprising a main frame and an auxiliary frame which are articulately interconnected for steering, and which frames respectively have rigidly secured thereto a wheel supporting axle. The material handling bucket or other attachment, its supporting boom, tilt linkage and the various fluid motors for vertically adjusting the boom and controlling the angle of the bucket relative to the latter are entirely mounted on the auxiliary frame. As a consequence of this construction, the vehicle operator by merely articulating the frames for steering can swing the auxiliary frame, and with it the loader mechanism, through a tight arc to position the filled material handling bucket over a conveyance to be loaded, thereby not requiring turning the entire vehicle about for this purpose.

Another feature of the aforementioned construction of this invention is that, by mounting the loader mechanism entirely on the auxiliary steerable frame, the clearance circle required for turning the vehicle about is substantially reduced compared to conventional constructions.

Another principal feature of this type of construction is that the vehicle has greater stability while operating on a side slope. In such a situation, the bucket loader mechanism is actually turned into the hill as the vehicle begins to travel either up-hill or down-hill thereby substantially reducing the danger of the vehicle tipping over.

Furthermore, the present invention includes an extremely simple means for operatively connecting the main and auxiliary frames together, which means include a series of swivel, universal or ball and socket joint connections substantially at the longitudinally extending midplane of the vehicle to define a vertical steering axis. Furthermore, the ball and joint connections which operatively connect the two frames are so positioned relative to each other so as to establish a horizontal longitudinally extending axis of relative oscillation between the respective vehicle frame members.

It is a further feature of this invention to suspend the respective frames of the vehicle from each other by three ball and socket joints lying substantially in a vertical plane and which are so positioned relative to each other as to form a vertical steering axis and horizontal axis of oscillation for the auxiliary frame member relative to the main frame.

Furthermore, according to this invention, a drive line conducts drive from a power plant mounted on the main vehicle frame to the wheels mounted on the auxiliary frame, and is so positioned relative to the aforementioned vertical steering axis as to provide constant velocity drive irrespective of the angle of articulation between the respective frames as the vehicle is steered.

These and other objects, features and advantages of this invention will appear more fully hereinafter as the description of the invention proceeds, and in which reference is made to the following drawings in which:

Figure 1 is a side elevation, partly in phantom, of the steerable material handling apparatus of this invention;

Figure 2 is a cross section, partly broken away, along line 2—2 of Figure 1;

Figure 3 is a top plan view of the steerable auxiliary frame;

Figure 4 is a cross section taken on line 4—4 of Figure 3 to show the manner of articulately connecting the frames together, as well as the relationship of the forward drive line thereto.

Referring now to the drawings, there is shown a rubber-tired tractor having a main frame 2 on which there is mounted behind the vehicle operator's compartment a power plant 4 for transmitting drive through the transmission 6 to the rear axle 8. Near its forward end, the main frame has an upwardly and forwardly inclined horse-neck 10 of substantially rectangular construction which at its top overlies two laterally spaced forwardly presented horizontal projections 12 on the main frame between which there is a third projection 14 substantially equidistant from the projections 12 and extending further forwardly thereof.

The steerable auxiliary frame 16 is of wishbone configuration and has two laterally spaced forwardly extending legs 18, and a rearwardly projecting tongue 20. A front axle 22 and differential housing construction 24 are rigidly bolted at 26 beneath the auxiliary frame 16 so as to extend laterally between the legs thereof. A constant velocity drive line 23 transmits drive from the transmission 6 to the front axle 22 so as to provide a vehicle having 4-wheel drive. As will appear more fully hereinafter, the forward drive line is so related with respect to the articulable connection between the vehicle frames as to give a constant velocity drive to the front axle irrespective of the steering position of the vehicle frames.

Referring to Figure 4 in particular, it may be seen that the auxiliary frame tongue 20 has a suitable formed socket therein to receive the downwardly presented ball 28 secured in the forward projection 14 of the main frame 2. A similar ball 30 is secured to the upper horizontally extending wall 32 of the horse-neck 10 of the main frame vertically above the ball 28 and is engaged within a socket formed in the upper end of a downwardly and forwardly inclined compression link or torque brace 34 having a suitable socket at its other end for receipt of a ball 36 secured to the differential housing 24 on the auxiliary frame substantially equidistant from the legs 18 thereof.

It will be noted that in the forward steering position as shown in the drawings, the three ball and socket connections are substantially in a vertical longitudinally extending plane passing through the mid-point of the vehicle. Moreover, the ball joint connections 28 and 30 define a vertical steering axis about which the respective vehicle frames may be selectively articulated, while the ball joint connections 28 and 36 define a horizontal longitudinally extending axis about which the auxiliary frame may oscillate relative to the main frame. Where all four wheels of the vehicle drive as shown in the preferred embodiment of this invention, such a horizontal axis of oscillation is required to prevent the vehicle from being supported only by one rear wheel and the diametrically opposite front wheel while traversing irregular terrain. Such a condition would cause a loss of drive due to the differential action in the respective axle final drives. The construction aforementioned precludes this condition from occurring, it being understood, of course, that suitable stop means can be incorporated in the construction to limit to any desired degree the amount of relative frame oscillation. By way of example, it has been found desirable to limit the oscillation of the vehicle disclosed to approximately eight degrees of oscillation or, in other words, so that a front wheel may be elevated or lowered approximately one foot relative to the rear wheels. Two laterally spaced fluid operated steering jacks 38 each have one end universally connected in a conventional manner to the forward end 40 of a wishbone leg 18 and to a forwardly extending projection 12 formed on the main frame substantially equidistant from the universal connection 28 of the latter to the auxiliary frame tongue 20.

In conducting drive from the transmission 6 to the front axle, it has been found to be desirable to employ a constant velocity drive line. Such a drive line, to be described, is so arranged as to counteract or cancel out positive and negative fluctuations or pulsations in the augular velocity of the drive line components. In conducting drive from a first shaft through a universal joint to a second coaxial shaft, it happens that in any one complete rotation of the first shaft the latter alternately speeds up and slows down. This rotational pulsation is, of course, transmitted through the second shaft to the driven vehicle wheels resulting in tire wear and power loss. To counteract this condition, the second shaft is connected through a second universal joint to a third coaxial shaft which is operatively connected in the usual manner to the driving wheels. The second universal connection serves to cancel out these pulsations as long as the component shafts remain substantially coaxial, thereby providing a constant velocity drive. If the first and third shafts assume dissimilar angles relative to the intermediate or second shaft, the constant velocity drive will be interrupted.

To this end, the front drive line 23 is of the constant velocity type in that it includes a shaft 25 which is operatively connected at its two ends by a universal joints 27 and 29, respectively, to the transmission 6 and to the front axle 22 through the differential thereof in the usual manner to conduct drive from the transmission 6 to the forward wheels. The shaft 25 includes two telescopically mating splined parts in the usual manner to accommodate relative axial movement between the transmission 6 and the final drive mechanism connected to the front driving wheels. Of particular significance, referring to Figure 4, it will be noted that the drive line 23 is bisected by the aforedescribed vertical steering axis between the two universal joints 27 and 29. As a result of this construction and arrangement, the drive line 23 will continue to conduct constant velocity drive even though the components of the drive line are not coaxial. For example, assuming that the forward auxiliary frame is steered to the left to any degree, the angle between the transmission output mechanism and the shaft 25 will equal the angle between the latter shaft and the input mechanism operatively connected to the front axle.

Referring now to the loader mechanism and the support therefor, two laterally spaced upstanding supporting pillars 42 are rigidly secured as by bolting to the brackets 44 on the wishbone legs 18, and have an upwardly and rearwardly curved portion 46 and a downwardly and rearwardly curved portion 48 which terminates behind and below the front axle 22. A pair of supporting beams 50 pivotally mount at their outer ends 52 a material handling device 54 which is herein shown to be a bucket. At their other ends 56, the respective beams are pivotally connected to the upstanding portion 46 of the supporting pillars at a point just forward of the vehicle operator's compartment. From this point, the respective beams may be seen to include a substantially forwardly extending portion, a dog leg extending downwardly and forwardly of the front axle 22, and a portion which again bends forwardly for pivotal connection to the loader bucket as aforementioned. Such a bucket boom configuration and connection to the vehicle is designed to provide a high lift, while clearing the front axle and not carrying the bucket too far forward when the boom is down as shown in Figure 1. Each of the beams 50 of the bucket boom is provided with a downwardly opening housing 58 extending outwardly therefrom near the upper portion of the beam to house and protect various pivot connections and linkage members to be described. A pair of fluid operated jacks 60 are respectively pivotally connected at one end 62 to the downwardly extending portion 48 of the supporting pillars, while the upper ends are pivotally connected at 64 within the housing 58 intermediate the length of the beams to vertically adjust the latter.

Pivotally mounted to each beam at 66 is a lever 68 of substantially bell crank configuration which has the upper shorter end thereof pivotally connected at 70 to a rigid link 72 the other end of which is pivotally connected at 74 to the upper portion 46 of the supporting pillars just forward and below the pivotal connection of the latter to the bucket supporting beams 50. At its other longer end, each lever 68 is pivotally connected at 76 to an extensible link, herein shown as being a fluid operated jack 78, which has its other end pivotally connected at 80 to the bucket 54 at a point spaced vertically above the pivotal connection of the latter to the bucket supporting beams.

A laterally extending tubular reinforcing member 82 extends between the supporting pillars 42 for reinforcement purposes, and similar members 84 are spaced along and between the bucket supporting beams 50 for the same purpose.

In operation, the steering jacks 38 may be extended and retracted by any conventional fluid system to articulate the auxiliary steering frame 16 about the vertical steering axis and relative to the main frame 2. The jacks 60 may be operated to selectively adjust the height of the bucket supporting beams 50 about the pivotal connections of the latter to the upstanding portions 46 of the supporting pillars. The tilt jacks 78 may be operated to vary the angle of the bucket to accomplish a digging operation, to roll the bucket backwardly with a load and to dump the bucket. It may be noted in this regard that the tilting linkage for the bucket is so designed as to give a roll-back feature whereby, after a loading operation and at the initial upward swing of the bucket beams, the bucket is rolled slightly backwardly and thereafter adjusted forwardly as the beam rise to prevent material from spilling from the bucket.

It may be seen, therefore, that the simple triangular mounting arrangement for relatively supporting the main and auxiliary frames of the vehicle furthermore establishes a vertical axis for steering and a horizontal axis for relative oscillation between the vehicle frames thereby insuring firm tractive and driving engagement of the front axle construction as it travels over irregular terrain. Moreover, this construction will avoid all of the disadvantages aforementioned which are inherent in structures of this type in which the loader mechanism is not completely supported by a steerable portion of the vehicle.

Furthermore, it may be seen that by utilizing this triangular mounting arrangement for inter-suspension of the main and auxiliary frames in conjunction with a forward drive line which is bisected by the vertical steering axis of the triangular mounting, the vehicle is provided with constant velocity drive irrespective of steering articulation between the respective vehicle frames. Thus, the arrangement as specifically shown in Figure 4 provides not only a vertical axis for steering and a horizontal axis of oscillation with the attendant advantages aforementioned, but also one which will eliminate power loss and tire wear due to pulsation in the drive line irrespective of the degree of steering articulation between the vehicle frames.

I claim:

1. A steerable vehicle comprising, a main frame, an auxiliary frame, each of said frames having a wheel driving axle rigidly secured thereto, means for interconnecting said frames for relative steering articulation therebetween, said means including a ball and socket connection between the adjacent ends of said frames, a compression link having one end connected to said main frame by a ball and socket connection vertically spaced above the connection of said main frame to said auxiliary frame, said compression link extending forwardly and downwardly from said connection and having its other end connected by a ball and socket connection to the auxiliary frame at a point spaced horizontally longitudinally forwardly of the connection between said auxiliary and main frames, the connections of said main frame to said auxiliary frame and compression link establishing a vertical steering axis, the connections of said auxiliary frame to said main frame and compression link establishing a horizontally longitudinally extending axis of relative oscillation between said frames, said points of connection all lying substantially within a vertical longitudinally extending plane through the midpoint of said vehicle while the latter is steered straight ahead, a pair of laterally spaced fluid actuated steering jacks each having one end pivotally connected to said main frame at a point spaced from said steering axis, the other ends of said jack extending forwardly to said auxiliary frame and being pivotally connected to the latter.

2. A steerable vehicle comprising, a main frame having a wheel driving axle rigidly mounted thereon, said frame having an upwardly forwardly inclined extension at its forward end, an auxiliary frame of substantially wishbone configuration and including forwardly extending laterally spaced legs and a rearwardly extending tongue, a wheel driving axle rigidly secured to said auxiliary frame between the legs thereof, means interconnecting the forward end of said main frame and the rear end of said auxiliary frame for relative articulation therebetween, said means including a swivel connection between said tongue of said auxiliary frame and the forward end of said main frame, a compression link having one end mounted to said extension of said main frame by a swivel connection vertically spaced above the connection of said main frame to said auxiliary frame tongue, the other end of said compression link being connected to the axle housing of said auxiliary frame between the legs of the latter at a point spaced horizontally longitudinally forwardly of the connection between said auxiliary and main frames, the connections of said main frame to said auxiliary frame and compression link establishing a vertical steering axis, and a fluid actuated steering jack having one end pivotally connected to said main frame, the other end of said jack being pivotally connected to a forwardly extending leg of said auxiliary frame, said jack being operable to articulate said frames relative to each other about said steering axis.

3. A steerable vehicle comprising, a main frame having a wheel driving axle rigidly mounted thereon, said frame having an upwardly forwardly inclined extension at its forward end, an auxiliary frame of substantially wishbone configuration and including forwardly extending laterally spaced legs and a rearwardly extending tongue, a wheel driving axle rigidly secured to said auxiliary frame between the legs thereof, means interconnecting the forward end of said main frame and the rear end of said auxiliary frame for relative articulation therebetween, said means including a ball and socket connection between said tongue of said auxiliary frame and the forward end of said main frame, a compression link having one end mounted to said extension of said main frame by a ball and socket connection vertically spaced above the connection of said main frame to said auxiliary frame tongue, said compression link extending forwardly and downwardly from said connection and being connected by a ball and socket connection to the axle housing of said auxiliary frame between the legs of the latter and at a point spaced horizontally longitudinally forwardly of the connection between said auxiliary and main frames, the connections of said main frame to said auxiliary frame and compression link establishing a vertical steering axis, the connections of said auxiliary frame to said main frame and compression link establishing a horizontal longitudinally extending axis of relative oscillation between said frames, and a pair of fluid actuated steering jacks spaced on either side of said steering axis, each having one end pivotally connected to said main frame and the other end pivotally connected to a forwardly extending leg of said auxiliary frame, said jacks being operable to articulate said frames relative to each other about said steering axis.

4. A steerable vehicle comprising a main frame, an auxiliary frame, each of said frames having a wheel-driving axle relatively non-steerably secured thereon, a first ball joint connection between the adjacent ends of said frames, the axis of said first connection being substantially vertical, a rigid link having one end operatively pivotally connected to said main frame at a point spaced above said first ball joint connection, said rigid link extending forwardly and downwardly from its connection to said main frame and having its other end connected to said auxiliary frame by a second ball joint connection at a point spaced horizontally longitudinally forwardly of said first ball joint connection, the axis of said second connection being substantially perpendicular to said rigid link, said ball joint connections defining a horizontally longitudinally extending axis of relative frame oscillation through the centers of the ball elements of said respective ball joint connections.

5. A steerable vehicle comprising a main frame, an auxiliary frame, each of said frames having a wheel-driving axle relatively non-steerably secured thereon, a first ball joint connection between the adjacent ends of said frames, the axis of said first connection being substantially vertical, a rigid link having one end operatively pivotally connected to said main frame at a point spaced above said first ball joint connection, said rigid link extending forwardly and downwardly from its connection to said main frame and having its other end connected to said auxiliary frame by a second ball joint connection at a point spaced horizontally longitudinally forwardly of said first ball joint connection, the axis of said second connection being substantially perpendicular to said rigid link, said ball joint connections defining a horizontally longitudinally extending axis of relative frame oscillation through the centers of the ball elements of said respective ball joint connections, and said connections all lying substantially within a vertical plane extending through the longitudinal axis of said vehicle.

6. A steerable vehicle comprising a main frame and auxiliary frame, each of said frames having a wheel-driving axle relatively nonsteerably secured thereon, a first ball joint connection between the adjacent ends of said frames, the axis of said connection being substantially vertical, a rigid link having one end connected to said main frame by a second ball joint connection at a point spaced vertically above said first ball joint connection, the axis of said second connection being substantially perpendicular to said rigid link, said rigid link extending forwardly and downwardly from said second connection and having its other end operatively pivotally connected to said auxiliary frame at a point spaced horizontally longitudinally from said first connection, said ball joint connections defining a vertically extending axis of relative frame pivoting movement through the centers of the ball elements of said respective ball joint connections.

7. A steerable vehicle comprising a main frame, an auxiliary frame, each of said frames having a wheel-driving axle relatively non-steerably secured thereon, a first ball joint connection between the adjacent ends of said frames, the axis of said connection being substantially vertical, a rigid link having one end connected to said main frame by a second ball joint connection at a point spaced vertically above said first ball joint connection, said rigid link extending forwardly and downwardly from said second connection and having its other end connected to said auxiliary frame by a third ball joint connection at a point spaced hoirzontally longitudinally forwardly of said first ball joint connection, the axes of said second and third connections being substantially perpendicular to said rigid link, said first and second ball joint connections defining a vertically extending axis of relative frame pivoting movement through the centers of the ball elements of said first and second ball joint connections, and said first and third ball joint connections defining a horizontally longitudinally extending axis of relative frame oscillation through the centers of the ball elements of said first and third ball joint connections.

8. A steerable vehicle comprising a main frame, an auxiliary frame, each of said frames having a wheel-driving axle relatively non-steerably secured thereon, a first ball joint connection between the adjacent ends of said frames, a rigid link having one end connected to said main frame by a second ball joint connection at a point spaced vertically above said first ball joint connection, said rigid link extending forwardly and downwardly from said second connection and having its other end connected to said auxiliary frame by a third ball joint connection at a point spaced horizontally longitudinally forwardly of said first ball joint connection, the axes of said second and third connections being substantially perpendicular to said rigid link, said first and second ball joint connections defining a vertically extending axis of relative frame pivoting movement through the centers of the ball elements of said first and second ball joint connections, and said first and third ball joint connections defining a horizontally longitudinally extending axis of relative frame oscillation through the centers of the ball elements of said first and third ball joint connections.

References Cited in the file of this patent
UNITED STATES PATENTS

| 811,944 | McHenry | Feb. 6, 1906 |
| 1,089,988 | Tichenor | Mar. 10, 1914 |
| 1,129,863 | Greer | Mar. 2, 1915 |
| 1,290,347 | Rader | Jan. 7, 1919 |
| 1,371,641 | Morton | Mar. 15, 1921 |
| 2,595,594 | Martin | May 6, 1952 |
| 2,598,863 | Tucker | June 3, 1952 |
| 2,625,231 | Martin | Jan. 13, 1953 |
| 2,683,496 | Prost | July 13, 1954 |
| 2,711,257 | Apel | June 21, 1955 |
| 2,787,391 | Matheson | Apr. 2, 1957 |
| 2,835,397 | Wagner | May 20, 1958 |

OTHER REFERENCES

Mixermobile Publication, FM-LD10-12053, 2 pages.
Mixermobile Publication, Form No. MM-2153, 8 pages.